United States Patent Office
3,667,732
Patented June 6, 1972

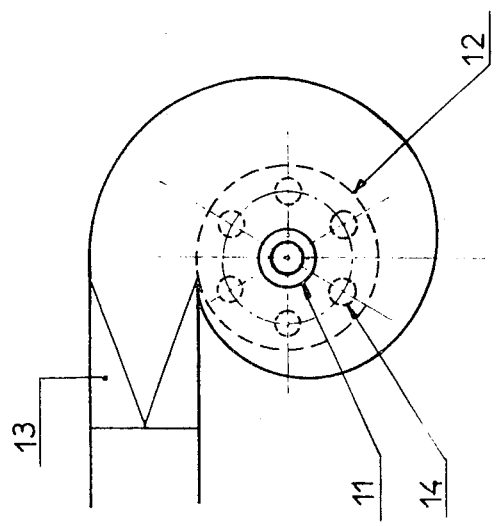
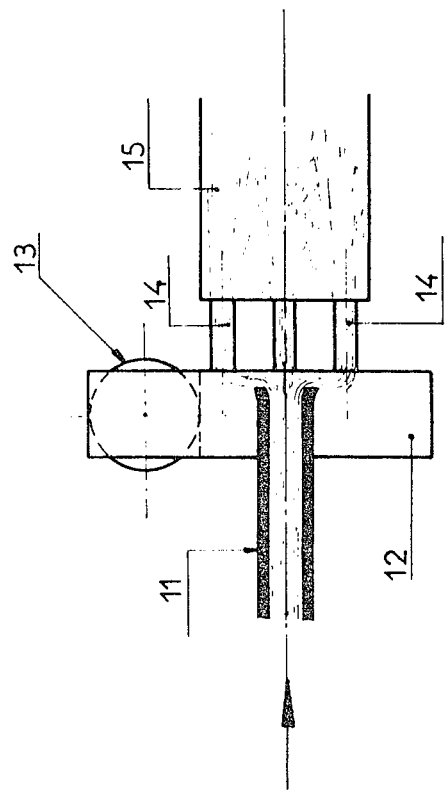

3,667,732
APPARATUS FOR PRODUCING A
HOMOGENEOUS MIXTURE
Pierre Lejeune, Grenoble, France, assignor to
Creusot-Loire, Paris, France
Filed Aug. 20, 1970, Ser. No. 65,363
Int. Cl. B01f 5/02
U.S. Cl. 259—4
3 Claims

ABSTRACT OF THE DISCLOSURE

A homogeneous mixture of two substances, for example a fluid suspension of fibres and a diluent in the manufacture of non-woven fabrics or paper pulp, is produced from a mixture of the two substances and injecting the mixture through a plurality of ducts into a dilution chamber.

The invention relates to a method of and apparatus for producing a homogeneous mixture of at least one substance which is in a fluid state or is carried in a fluid, with a second substance which is either in a fluid state or mixed with a fluid.

The method is particularly suitable for the manufacture of non-woven fabrics, whereby fibres are dispersed homogeneously in a large volume of air or liquid. The fibres to be mixed may be dry or, more usually, in a highly concentrated liquid suspension.

The invention can also be used in the papermaking industry, to produce a homogeneous dispersion of fibres, loadings or adjuvants used in making the paper pulp.

According to the invention, the method comprises producing a mixture of said substances in which one substance is dispersed in the other and injecting said mixture into a dilution chamber in the form of a plurality of jets.

One apparatus for carrying out the above method comprises a dispersing and distributing chamber having opposed walls, a first inlet duct for one of said substances, said first inlet duct being connected to one of said opposed walls of said chamber, a plurality of second inlet ducts for another of said substances, said plurality of second inlet ducts being connected to said one wall of said chamber around said first inlet duct, a plurality of outlet ducts connected to the other of said opposed walls of said chamber so as to be offset relative to said plurality of second inlet ducts and a dilution chamber, said outlet ducts connecting said dispersing and distributing chamber to said dilution chamber.

Another apparatus for carrying out the above method comprises a dispersing and distributing chamber having opposed walls, a first inlet duct for one of said substances connected to one of said opposed walls of said chamber, a second inlet duct for another of said substances connected to said chamber and arranged such that said other substance passes into said chamber tangentially with respect to input of said one substance, a plurality of outlet ducts connected to said other of said opposed walls and a dilution chamber, said outlets connecting said dispersing and distributing chamber to said dilution chamber.

A further apparatus for carrying out the above method comprises a plurality of ducts for one of said substances, a dilution chamber, said ducts being connected to said dilution chamber and means for injecting another of said substances into said ducts.

Embodiments of the invention will now be described, by way of example only, with reference to the accompanying drawings, in which:

FIG. 3 shows an axial section through a second embodiment of the invention;

FIG. 4 shows a cross-section through the embodiment of FIG. 3; and

Figure 1:
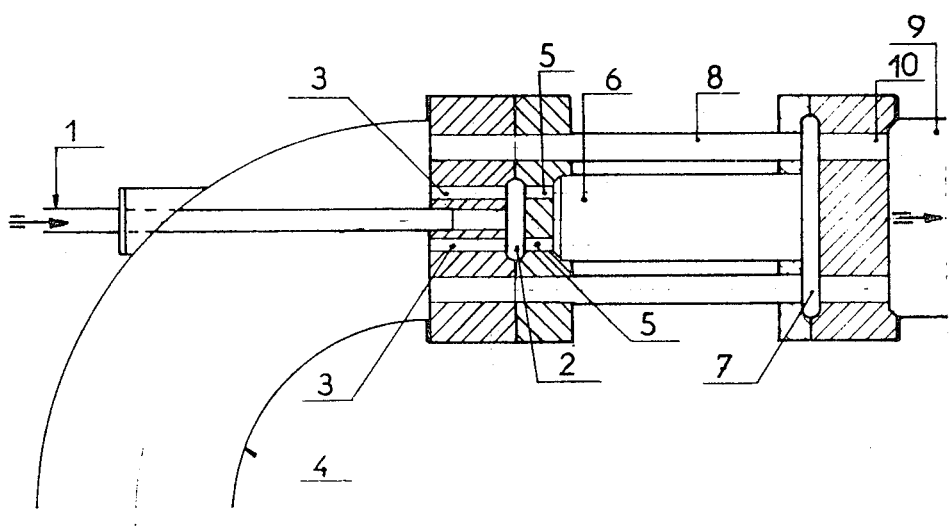
FIG. 1 shows an axial section through an embodiment of the invention.
Figure 2:
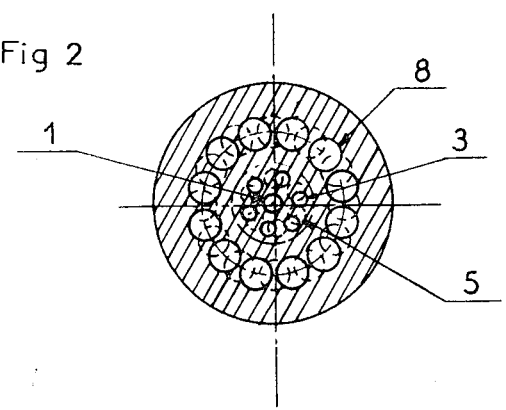
FIG. 2 represents a section in the plane II—II in FIG. 1.

As shown in FIG. 1, an inlet duct 1 for concentrated liquid which is to be diluted leads into a dispersing and distributing chamber 2. Ducts 3, arranged symmetrically around the duct 1 and supplied with diluent liquid by an inlet duct 4, also lead into the chamber 2 and supply the diluent liquid to it in the form of a plurality of jets. The ducts 1 and 3 are also visible in FIG. 2. A mixture of the concentrated liquid and diluent liquid is formed in the chamber 2 and is discharged along ducts 5, which are angularly offset relative to the inlet ducts 3 as shown in FIG. 2 (in which the ducts 5 are shown by broken lines).

The ducts 5 lead to a dilution chamber 6 into which the mixture is injected in the form of a plurality of jets. The chamber 6 leads to a second distributing chamber 7, to which diluent liquid is supplied directly from the inlet duct 4 along ducts 8. In this chamber 7, which forms the second stage of the apparatus, further dilution of the mixture takes place. The total dilution will be adequate for most purposes. The mixture from chamber 7 then flows into a second dilution chamber 9 along ducts 10, where the mixture may be used if the dilution is considered adequate.

If the dilution is not sufficient, the chamber 9 may be followed by as many supplementary dilution stages as required, each stage being similar to the above described second stage, that is to say, with a third distributing chamber to which the chamber 9 is connected, which is similar to chamber 7, and is supplied with diluent liquid either from the duct 4 or from another diluent inlet duct. This third distributing chamber is connected to a third dilution chamber similar to chamber 9 into which the mixture is injected in the form of a plurality of jets.

FIGS. 3 and 4 show a second embodiment of the invention in which the fluid to be diluted is introduced axially along a duct 11 into a dispersing and distributing chamber 12, whereas the diluent fluid is introduced tangentially at the periphery of this chamber by means of a duct 13. In the chamber 12 one of the fluids is dispersed unniformly in the other, and the resulting mixture is discharged from the chamber 12 along a plurality of ducts 14, which introduce it in the form of a plurality of jets into a dilution chamber 15.

Figure 5:
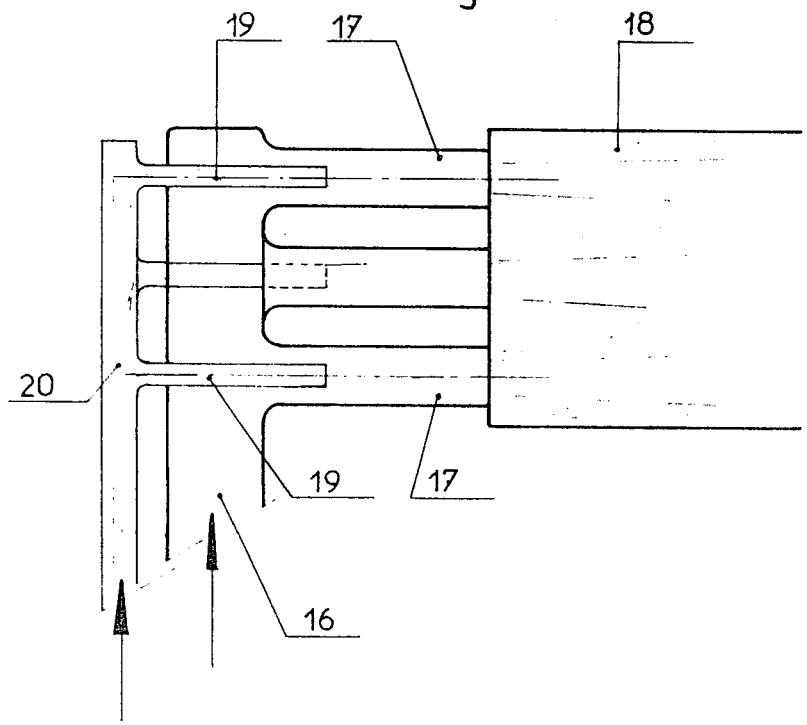
FIG. 5 represents an axial section through another embodiment of the invention.

FIG. 5 illustrates another embodiment of the invention, in which the diluent fluid is introduced by way of a header 16 into multiple ducts 17 leading directly into the dilution chamber 18. The fluid to be diluted is injected along tubes 19, supplied by a header 20, directly into the multiple ducts 17, dispersing one fluid uniformly in the other inside each duct. The resulting mixture is injected into a dilution chamber 18 at the end of the ducts 17 in the form of a plurality of jets.

Having thus described my invention what I claim is:

1. Apparatus for obtaining a strongly diluted and homogeneous mixture of fibres in water, air or other fluids particularly for the paper industry or the manufacture of non-woven textiles using a concentrated mixture of fibres in a liquid comprising at least one assembly having, successively in the direction of circulation of the fluid, a dispersing and distributing chamber having a long axis, at least one conduit opening into said chamber for the introduction of a concentrated mixture of fibres and fluid to said chamber, at least one conduit opening into said chamber for the introduction of a fluid for diluting the mixture, a dilution chamber, regularly disposed multiple conduits connecting said chambers and producing a jet toward said dilution chamber, a second dispersing and distributing chamber, said dilution chamber being connected to said second dispersing and distributing chamber supplying a less concentrated mixture of fibres and fluid thereto, means for supplying a fluid for diluting the mixture to said second dispersing and distributing chamber, a second dilution chamber and regularly disposed multiple conduits connecting said second chambers producing a jet toward said second dilution chamber.

2. Apparatus as described in claim 1, said conduit for introducing the concentrated mixture to said dispersing and distributing chamber extending in the long axis of said chamber and said conduits for the introduction of the diluting fluid being regularly distributed around said conduit.

3. Apparatus as described in claim 2, said conduits connecting said dispersing and distributing chamber to said dilution chamber being equal in number to and having the same distribution as said conduits for introduction of the diluting fluid to said dispersing and distributing chamber and being angularly offset with respect to said last-named conduits.

References Cited

UNITED STATES PATENTS

| 2,802,648 | 8/1957 | Christensen et al. | 259—4 X |
| 3,246,883 | 4/1966 | Ashbrook | 259—4 X |
| 3,153,578 | 10/1964 | Taylor | 259—4 X |
| 2,747,974 | 5/1956 | Felger | 259—4 X |

EDWARD L. ROBERTS, Primary Examiner